Feb. 23, 1932.  E. T. JAMES  1,846,730
MEANS FOR THE TRANSMISSION OF POWER FROM THE DRIVING
OR TRACTION WHEELS OF MOTOR VEHICLES
Filed April 5, 1930    2 Sheets-Sheet 1

Inventor:
E. T. James
By his Attorney John O. Seifert

Feb. 23, 1932.　　　　　　　　　　　　　　　　1,846,730
E. T. JAMES
MEANS FOR THE TRANSMISSION OF POWER FROM THE DRIVING
OR TRACTION WHEELS OF MOTOR VEHICLES
Filed April 5, 1930　　　2 Sheets-Sheet 2

Inventor:
E. T. James
By his Attorney John O. Seifert

Patented Feb. 23, 1932

1,846,730

UNITED STATES PATENT OFFICE

EDWIN THOMAS JAMES, OF CASTERTON, VICTORIA, AUSTRALIA

MEANS FOR THE TRANSMISSION OF POWER FROM THE DRIVING OR TRACTION WHEELS OF MOTOR VEHICLES

Application filed April 5, 1930, Serial No. 441,780, and in Australia April 13, 1929.

This invention relates to means or apparatus for the transmission of power from the propulsive or traction wheels of motor vehicles to operate machinery, and has special reference to improved apparatus or mechanism to elevate and support in raised position an axle carrying traction wheels of a motor vehicle and to accommodate power transmitting means, and adapted under gravity to set the power transmitting means into contact with, and to bear upon and be frictionally driven by the traction wheels to operate any machine or mechanism connected therewith.

An object of the present invention resides in the provision of means or apparatus having the above-mentioned characteristics, and simple in construction and accordingly of low cost in manufacture, light in weight and very compact so as to be easily transported from place to place, and adapted to be quickly placed in an operative position by a person without the use of tools or preliminary preparation of the ground or other surface.

Owing to its portability, apparatus constructed in accordance with the invention may be easily carried in a motor vehicle from which it is to transmit power to operate machinery. In this way it may be taken to a place at which a fixed or stationary machine, such as a chaff-cutter, saw bench, pump or other machine, is located, and readily set up to drive the same. Moreover, it may also be arranged to operate a machine, such as for example, a concrete mixer, air compressor, or an electric generator, mounted upon the vehicle itself.

Another object of the invention is to furnish means for apparatus for the above-mentioned purposes, which may be easily adjusted to suit the dimensions of different motor vehicles, and readily accommodated to various track widths, wheel dimensions, and axle clearances or heights above ground level.

In this invention manually operable lifting means is provided to raise, support, and lower an axle carrying traction wheels and to accommodate detachable power transmitting means having thereon friction wheels and one or more power transmitting elements.

The lifting means is operated to initially raise and support in an elevated position the axle and traction wheels and the portions of a motor vehicle carried thereby. The detachable power transmitting means is then placed upon and accommodated by the lifting means, whereupon the latter is actuated to lower the axle and traction wheels and simultaneously move the power transmitting means towards the descending traction wheels, and the friction wheels contact with and under gravity bear upon and are rotated by the traction wheels to revolve the power transmitting element or elements, and the said friction wheels prevent further descent of the traction wheels which, accordingly, remain clear of the ground or other supporting surface.

Locking means, adjustably engageable with the lifting means, are provided to maintain the latter in vertically adjusted positions, and to regulate the pressure between the friction wheels and the traction wheels, or to hold the former apart from the latter.

A further object of the invention is to provide separate and independently operated elevating means adapted to be positioned at or near the opposite ends of an axle on which the traction wheels of a vehicle are mounted, and to be actuated one at a time to raise the adjacent traction wheel clear of the ground or supporting surface, and to independently adjust the elevations of the opposite traction wheels to conform with the inclination or inequalities of the ground or supporting surface, and also to accommodate and set a detachable shaft carrying friction wheels and one or more power transmitting elements in alignment with the driving shaft of any machine to be operated.

Each lifting means or unit comprises a jack having interconnected members adapted to be actuated to raise, support, and lower the axle and traction wheels, releasable locking means adjustably engageable with the interconnected members and adapted to maintain the same in adjusted positions, and a mounting or bearing support carried by the interconnected members and adapted to receive and detachably accommodate one of a pair of bearings on a shaft positioned transversely to the lifting means or jacks and supported thereby and having thereon friction wheels and one or more power transmitting elements.

The interconnected members of each jack are adapted under the weight of the vehicle to move the bearing supports or mountings and therewith the transversely positioned shaft towards the axle, and thereby cause the friction wheels to contact with and bear upon the peripheries of the traction wheels. This movement may be restrained by the releasable locking means, which may be engaged with the interconnected members to regulate, as required, the pressure between the friction wheels and the traction wheels, or to hold the former away from the latter. In this way the friction wheels may be adjusted to contact lightly with the traction wheels, or to bear more or less heavily thereon.

By the provision of independent or separate lifting means or jacks at each end of an axle carrying traction wheels, an operator can actuate one jack at a time, and the operations of positioning and removing the same and mounting the detachable shaft thereon are greatly facilitated. Moreover, the two jacks and the detachable shaft, comprise three separate units which are comparatively small and light and very convenient for the purposes of transport.

For some purposes, a single jack may be employed having thereon frictionally driven power transmitting means, and a traction wheel at one end only of an axle need be elevated to rotate the said power transmitting means to operate a machine connected therewith.

In the accompanying drawings illustrating the invention:—

Figure 1:
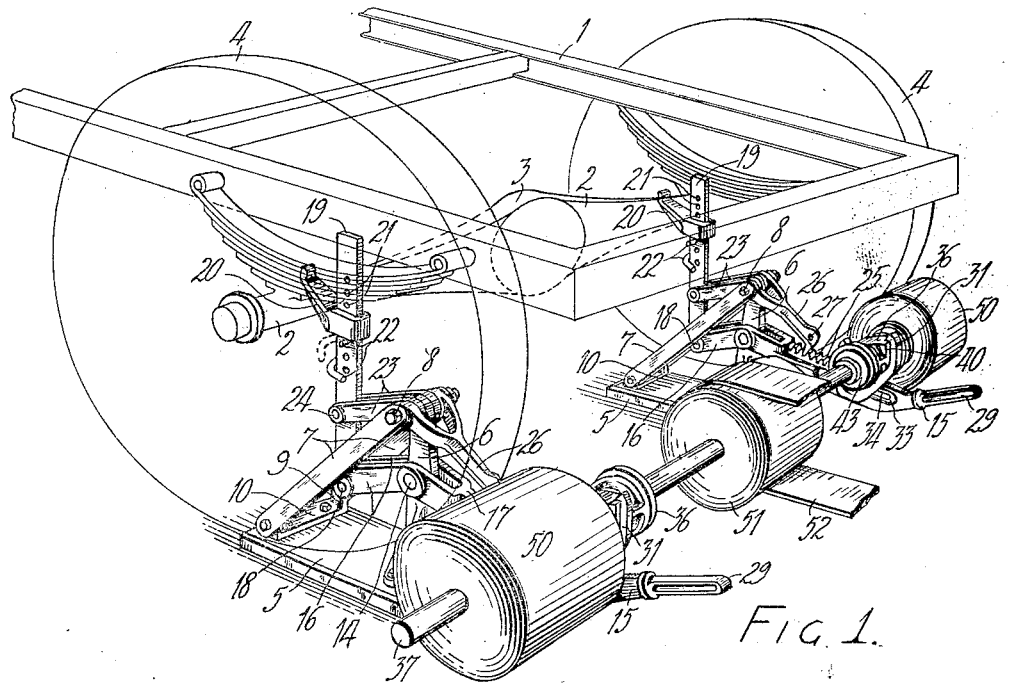
Figure 1 is a view in perspective of power transmitting apparatus and portion of a motor vehicle.

In these drawings the numeral 1 designates portion of the chassis of a motor vehicle having an axle 2 with housing 3 enclosing the usual differential gearing (not shewn), and propulsive or traction wheels 4 from which power is to be transmitted to operate machinery.

The numeral 5 denotes the base boards or bed plates of lifting means or jacks adapted to be positioned at or near the opposite ends of the axle 2. The base boards or bed plates 5 may be constructed of timber as illustrated in Figure 1, or of metal, as shewn in Figures 2, 3, and 4.

Figures 2, 3:
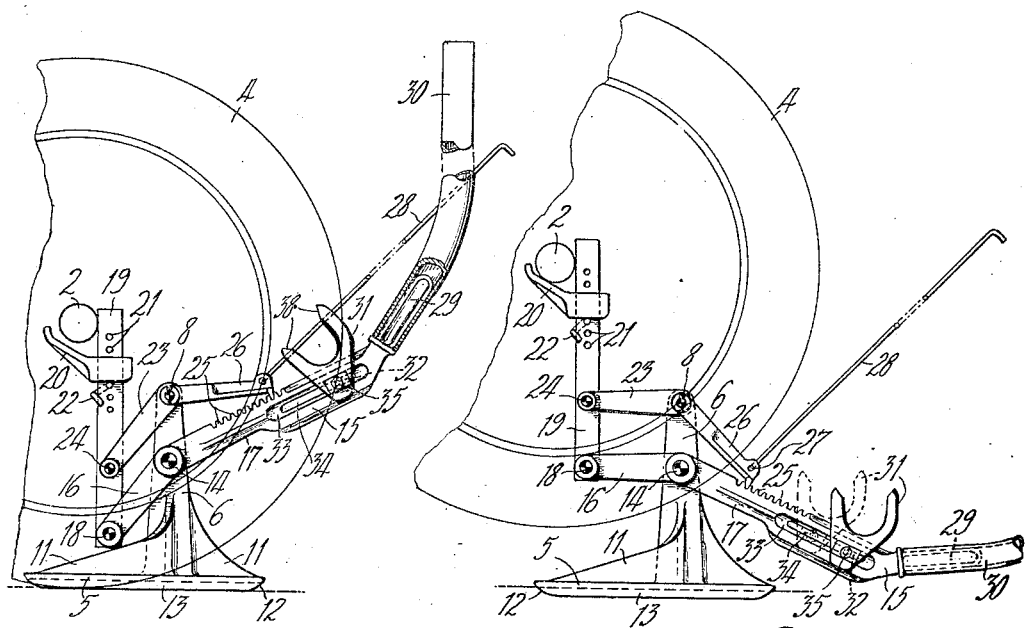
Figures 2 and 3 are views in side elevation, shewing part of the apparatus in Figure 1 in different positions, and a modified detail.
Figure 4:
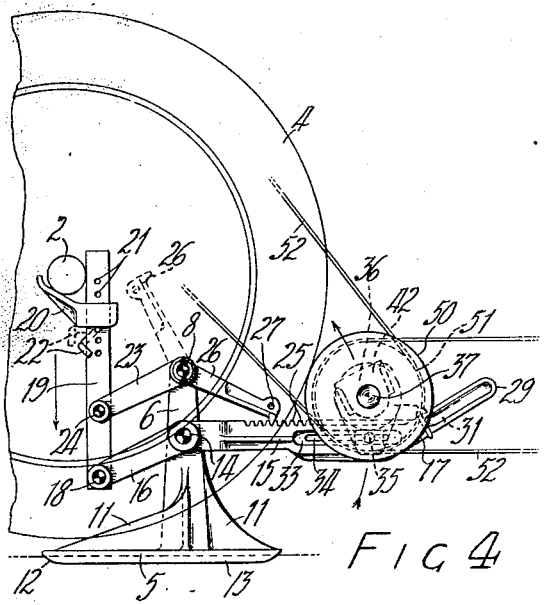
Figure 4 is a view inside elevation of the apparatus shewn in Figure 1, but modified in detail.

On each base board or bed plate 5 is an upright standard or post or pillar 6, which may be bolted to the base board as in Figure 1, or formed integrally with the bed plate by casting, as shewn in Figures 2, 3, and 4.

The standard 6, when fixed or bolted to the base board 5, is firmly braced by stays 7 attached to a transverse pin or bolt 8 and bolted to lugs 9 which may be conveniently formed on a metal strip 10 fixed to the base board 5. The standard 6, when cast integrally with the bed plate 5, may be reinforced by radiating ribs 11 which also stiffen the bed plate.

Figure 5:
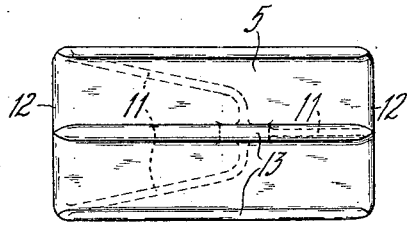
Figure 5 is an inverted plan view of a detail of Figures 2, 3, and 4, drawn to a larger scale.

To enable the jack to be easily positioned beneath an axle 2, the ends of the base board or bed plate 5 may be chamfered as at 12, and longitudinal ribs 13, Figure 5, may be cast on the underside of the bed plate 5. The ribs 13 may be pointed or bevelled at their opposite ends, as shown, and they form skids which move easily over the ground when the jack is being pushed into position or withdrawn. Moreover, the ribs 13, under the weight of the vehicle are forced into the ground, and thereby steady the jack when the apparatus is in operation. For the same purpose, strips or cleats may be fixed to the underside of the base board 5.

Pivotally supported on a pin or bolt 14, passed transversely through the standard 6 at a required height above the base board or bed plate 5, is a lever 15 one arm 16 of which is located between the stays 7 or ribs 11, whereas the opposite arm 17 is extended for a sufficient distance on the other side of the standard 6.

The arm 16 of the lever 15 is shorter than the opposite arm 17, and the arms 16 and 17 are, preferably, inclined to each other, as shown, to secure greater compactness and also for a purpose hereinafter referred to.

The arm 16 consists of two similar parallel parts, which may be made separately from the arm 17 and secured thereto by bolts (not shown), or formed as integral extensions of the arm 17, as illustrated.

Mounted on a pin or bolt 18 passed transversely through the end of the arm 16, is a vertically disposed member or strut 19 on which is adjustably mounted a dog or supporting member 20 adapted in use to bear against, elevate, and support the axle 2 in raised position.

A series of holes 21 are provided in the strut 19, into one or other of which a detachable pin 22 may be inserted to support and position the dog 20 to suit the clearances or heights of the axles of various vehicles above the ground level. The pin 22 is inserted into one side of the strut 19 and is bent around the same, and its opposite end extends partly across the other side of the strut 19, so that in use the pin 22 cannot become accidently displaced and requires to be raised against gravity to the position indicated by broken lines in Figures 1 and 4, before it can be withdrawn.

In order that the strut 19 may be maintained upright in all positions of the lever 15, as shown in Figures 2, 3, and 4, it is provided with a parallel movement by means of constraining links 23. The links 23 are made equal in length to the arm 16 of the lever 15, and they are pivoted on the transverse pin or bolt 8 and are connected by a pin 24 to the strut 19; the distance between the pins 18 and 24 being made equal to the distance between the transverse pin 8 and the pivot pin or bolt 14. By this means the strut 19 is constrained to move in an arcuate path, and is maintained upright in all adjusted positions.

The arm 17 is provided with a series of notches or toothed rack 25 with which is adjustably engageable a releasable member or pawl 26 pivoted on the transverse pin or bolt 8, and adapted to maintain or lock the lever 15 in adjusted positions.

In order that the pawl 26 may be disengaged from the rack 25, a hole 27 is provided in the former into which the bent end of a rod 28 may be inserted by an operator to conveniently raise the pawl 26, as and when required.

The arm 17 of the lever 15 is provided with an extension or handle 29 adapted for engagement by a detachable tubular rod 30, which may be bent or curved as shown in Figure 2, so as to be conveniently located when the arm 17 is moved into the position shown in Figure 3.

Upon the arm 17 is mounted a yoke or slotted plate 31, which is provided with a boss 32 adapted to fit a longitudinal recess 33 in the said lever 15.

Within the recess 33 and extending through the lever 15 is a slotted opening 34 through which extends a bolt 35 which also passes through the yoke 31 and maintains the same in place on the arm 17. Upon slackening the bolt 35, the yoke 31 may be moved along the arm 17 and it may be secured in an adjusted position by retightening the said bolt 35.

The yoke 31 upon each of the said jacks is adapted to receive and accommodate one of two bearings 36 mounted on and adapted to rotatively support a detachable shaft 37, and the yokes 31 are chamfered, as at 38, to provide flared entrances to enable the bearings 36 to be easily placed in position.

The bearings 36 are adapted to freely fit the yokes 31 in order that the shaft 37 may readily adapt itself to inequality of alignment between the opposite yokes 31 without imposing undue strain upon the said bearings. Endwise movement of the bearings 36 in the yokes 31 is prevented by oppositely disposed slots 39, shewn clearly in Figure 7, which become engaged by the yokes 31, when the bearings are inserted therein.

The slots 39 are conveniently formed by casting at required intervals apart ribs 40 on the peripheries of the bearings 36, and in order to further facilitate the placing of the bearings in the yokes 31, the ribs 40 are chamfered at their lower ends, as at 41.

Figure 9:
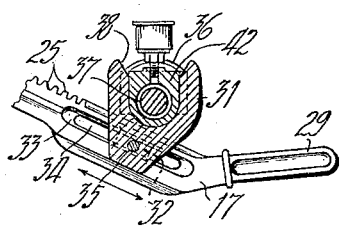
Figure 9 is a view in transverse section on the line 9—9 in Figure 8.

The portions of the bearings 36 within the yokes 31 conform in section to the same, as shewn in Figure 9, and the bearings are in this way provided with eccentric portions or abutments 42 which effectively prevent rotation of the said bearings in the yokes 31.

Fixed to the shaft 37, and positioned on opposite sides of one of the bearings 36, are collars 43 which maintain the said bearing in position when the shaft 37 is not in use, and prevent endwise movement of the said shaft when the same is in operation. The other bearing 36 is free to slide upon the shaft 37 in order that it may be easily placed in position in one of the yokes 31 after the fixed bearing 36 has been already accommodated by the opposite yoke.

Figure 7:
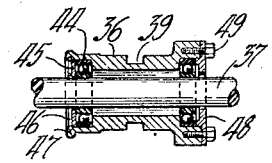
Figure 7 is a view in longitudinal section on the line 7—7 in Figure 6, shewing alternate details.
Figure 6:
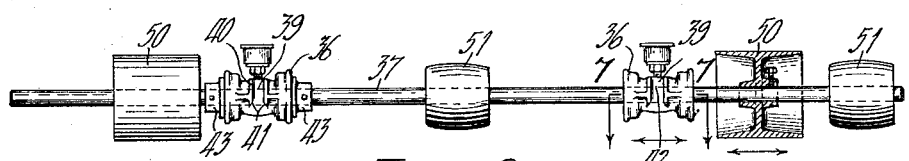
Figure 6 is a view in side elevation and part section of a detachable portion of the apparatus shewn in Figures 1 and 4.
Figure 8:
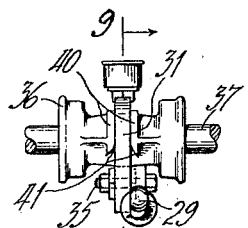
Figure 8 is a fragmentary view in side elevation of a detail of the invention.
Figure 10:
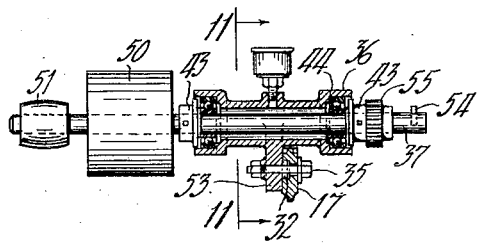
Figure 10 is a view in side elevation and part section of a modified detail of the invention.

The bearings 36 may be of ordinary journal construction, but they are preferably provided with ball or roller bearings, and ball races 44 may be provided at opposite ends of the bearings 36, as illustrated in Figures 7 and 10.

The ball races are maintained in position in the fixed bearing 36 by the collars 43, as will be evident from Figure 10. In the slidable bearing 36 the ball races 44 may be retained in place by a plate 45, Figure 7, held in position by a spring ring 46 adapted to fit an annular groove 47 on the inner periphery of the bearing 36. Alternatively, a cover plate 48, fixed to the bearing 36 by screws 49, may be employed for the purpose.

The opposite ends of the shaft 37 are provided with friction wheels 50, one or both of which may be adapted for endwise adjustment to suit the tracks or distances between the opposite traction wheels 4 of different motor vehicles.

The shaft 37 may be provided with one or more pulleys or sheaves 51 for driving by belting 52, any machine or machines, and the pulleys 51 may be positioned on the portion of the shaft 37 between the friction wheels 50, or on the parts of the shaft 37 extending outwardly from the said friction wheels. The belting 52 may be connected to a machine positioned to the rear of the vehicle or in other location, or it may be arranged to drive any machine or mechanism mounted on the vehicle itself.

Alternatively, the shaft 37 may be provided with any required type of driving gears, or with clutches, or with universal joints, or other power transmitting means or mechanism.

The method of applying the above described apparatus to a motor vehicle to operate machinery will now be described in detail, attention being more particularly directed to Figures 2, 3, and 4 of the drawings.

The motor vehicle having been positioned at a required distance from a machine to be operated, which for convenience of description will be assumed to be belt driven, one of the said lifting means or jacks is placed at or near an end of the axle 2 with the handle or extension 29 thereof extending in the direction of the rear of the vehicle.

The lever 15 of the jack is adjusted into the position shown in Figure 2, wherein the strut 19 is located at or near its lowest position and the handle 29 is raised to an elevated position.

The dog 20 is then manually adjusted, if required, and secured by the pin 22 in contact with or closely to the axle 2. The other jack is then similarly positioned and arranged at or near the opposite end of the axle 2.

It will be observed that in the position of the jacks, shewn in Figure 2, it will not be possible to place the bearings 36 in the yokes 31 and accordingly the shaft 37 in position, as the said yokes are positioned within the circumference of the traction wheels 4.

The detachable tubular rod 30 is next applied to the extension or handle 29 of each jack in turn, and the arms 17 of the levers 15 are depressed to raise the arms 16, struts 19, and axle 2 and traction wheels 4 into the position shewn in Figure 3, wherein they are maintained by engagement of the pawls 26 with the racks 25.

The traction wheels 4 are now supported in an elevated position well clear of the ground or supporting surface, and the yokes 31 are disposed in positions wherein they are in readiness to receive and accommodate the bearings 36 of the detachable unit or shaft 37.

The shaft 37 with the belting 52 looped thereon, is then positioned transversely to the jacks and the fixed bearing 36 is placed in one of the yokes 31, and the slidable bearing 36 is adjusted along the shaft 37 until it can be freely accommodated in the opposite yoke.

By means of the detachable tubular rod 30 applied to the handle 29 of one of the jacks, the operator depresses the arm 17 thereof sufficiently to enable the pawl 26 to be released from the rack 25 by the releasing rod 28, and then, holding the pawl out of engagement, allows the lever 15 to turn upon the pivot pin 14 under the weight of the raised portion of the vehicle.

The strut 19 is thereby forced downwardly, and the yoke 31 and the end of the shaft 37 supported thereby, are simultaneously elevated to place the corresponding friction wheel 50 in contact with the nearby descending traction wheel 4, as shewn in Figure 4.

The operator then applies the tubular rod 30 to the handle 29 of the opposite jack, and similarly lowers the other traction wheel 4, and elevates the adjacent friction wheel 50 into contact therewith.

The downward movements of the traction wheels 4 are arrested by contact of the friction wheels 50 therewith, and the said traction wheels are maintained at a lower level than their original altitude in Figure 3, but still sufficiently clear of the ground or supporting surface for the purposes of power transmission, as shown in Figure 4.

When the descent of the traction wheels 4, is arrested in this way, the full weight carried thereby may be used to press the friction wheels 50 into contact with the traction wheels. However, the force therebetween may be reduced to a required extent by operating the jacks and re-engaging the pawls 26 with appropriate teeth 25 on the arms 17, whereby a greater or less amount of the pressure is supported by the said pawls.

In most cases, it is advantageous to use the full weight carried by the traction wheels 4 to force the friction wheels 50 into contact therewith, and to prevent any restraining action by the pawls 26, the same may be moved into the position indicated by broken lines in Figure 4.

The parallel movements of the said struts 19, displaces the traction wheels rearwardly as well as downwardly, and this motion is accentuated owing to the relative inclinations of the arms 16 and 17 of the levers 15. Simultaneously with the descent of the traction wheels 4, the arms 17 swing upwardly and forwardly, carrying with them the shaft 37 and the friction wheels 50, so that the said friction wheels and traction wheels have considerable relative movement and are firmly brought into contact.

By altering, if necessary, the positions of the yokes 31 on the arms 17, and adjusting the pawls 26 to engage appropriate teeth 25 thereon. The shaft 37 may be accommodated to the inclination of the surface level, and it may be accurately set in alignment with the shaft of a machine to be operated.

After the friction wheels 50 and shaft 37 have been adjusted, if required, the driving belt 52 connecting the pulley 51 to the machine to be operated is placed in position.

The engine of the vehicle is then set in motion, and its power is transmitted in the usual way through the clutch and gear box (not shewn) to the traction wheels 4 which rotate the friction wheels 50 bearing thereon, and by means of the pulley 51 and belting 52, operate the machine as required.

The frictional resistance at the line of contact of the traction wheels 4 and the friction wheels 50 has an uplifting action on the arms 17 of the levers 15, and increases the effect of the weight supported by the struts 19 in applying pressure between the said friction and traction wheels. Moreover, it will be obvious that, if the frictional resistance becomes greater, the uplifting effect will be likewise increased, and the friction wheels 50 will bear more heavily on the traction wheels 4.

The torque driving the traction wheels 4 sets up downward pressure, which acting on the struts 19 in the same direction as the weight supported thereby increases the upward reaction of the arms 17 of the levers 15, and accordingly applies the friction wheels 50 to the traction wheels 4 with greater force than when the apparatus is at rest.

If now, from any cause such as abnormal loading or sudden change of load on a driven machine, the driving resistance of the traction wheels 4 be increased, the torque driving the same will also be increased, and the downward force on the struts 19 will be likewise augmented, and the upward reaction of the arms 17 of the levers 15 will become correspondingly greater, so that the friction wheels 50 will be caused to bear upon the said traction wheels with increased pressure.

It has been found that the above conditions hold good in practice, and that the apparatus automatically adapts itself to variations of load in a driven machine, so that as the load increases the friction wheels 50 are applied to the traction wheels 4 with correspondingly greater pressure. Accordingly, slipping between the tires of the traction wheels 4 and friction wheels 50 under heavy load, or under sudden changes of load, is effectively obviated.

The yokes 31 do not require means to hold the bearings 36 in place, as in operation the pressure between the friction wheels 50 and traction wheels 4 positively prevents displacement of the bearings 36, and the inclination of the yokes 31 toward the traction wheels 4, as shown in Figure 4, further obviates any possible displacement of the said bearings.

At the conclusion of a power transmitting operation, and after removal of the belting 52 from the pulley 51, the detachable tubular rod 30 is applied to the extension or handle 29 of each jack in turn, and the levers 15, traction wheels 4, and the detachable power transmitting unit comprising the shaft 37, bearings 36, friction wheels 50, and pulley 51, are returned to the position shewn in Figure 3 and maintained therein by engagement of the pawls 26 with the racks 25, and the said power transmitting unit may then be lifted from the yokes 31.

The releasing rod 28 is then engaged with the pawl 26 of one of the jacks, and the tubular rod 30 is applied to the handle thereof. The operator applies downward pressure to the arm 17 and releases the pawl 26, and then permits the nearby traction wheel 4 to descend under gravity to the ground level, the lever 15, strut 19, and dog 20 being at the same time returned to the original position in Figure 2.

This operation is then repeated with the other jack, whereafter by further raising the arm 17 of each lever 15 in turn to sufficiently lower the corresponding dog 20 to clear the axle 2, the jacks may be withdrawn from beneath the vehicle.

In some cases, and especially in the operation of light machinery, such as for example sheep shearing machines, portable drilling machines, and the like, one jack only may be employed and operated to raise an adjacent traction wheel 4 and maintain the same in an elevated position by engagement of the pawl 26 with the rack 25, as above described.

Figure 11:
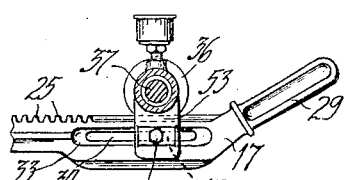
Figure 11 is a view in transverse section on the line 11—11 in Figure 10.

In the power transmitting unit employed in such cases, the yoke 31 may be dispensed with, and the bearing 36 may be provided with an extension or lug 53, Figures 10 and 11, having thereon a boss 32 engageable with the recess 33, and the bearing 36 may be firmly secured to the arm 17 by a bolt 35 passing through the lug 53 and the slotted opening 34. Moreover, by releasing the bolt 35, the bearing 36 may be moved along the arm 17 to set the friction wheel 50 supported by the shaft 37 more or less closely in contact with the traction wheel 4, and the said friction wheel may after adjustment be firmly secured in position by re-tightening the bolt 35.

The shaft 37 is preferably mounted on ball races 44, and is retained in the bearing 36 by collars 43, as previously described, and the said shaft may be provided with a pulley 51 for transmission of power by belting, or with a pin 54, or the like for operative connection with flexible shafting to drive sheep shearing machines or like portable machinery, or again with a pinion 55 for operating a tyre pump (not shewn) or other machine mounted on the arm 17.

In the foregoing, apparatus has been described for the transmission of power from elevated traction wheels of a motor vehicle, but conversely, power may be conveniently applied thereby to the traction wheels to rotate the same and the transmission and engine of a motor vehicle, when the same is being repaired, and conditioned or "run in".

I claim:—

1. Apparatus for transmission of power from the traction wheels of motor vehicles, comprising lifting means having levers to raise, support, and lower an axle carrying traction wheels, racks on the levers, pawls releasably engageable with the racks and adapted to maintain the levers in adjusted positions, a detachable power transmitting unit, and adjustable mountings on the levers to accommodate the power transmitting unit and adapted, when the levers are actuated to lower the axle and traction wheels from a raised position to a less altitude, to be simultaneously elevated to set and maintain under gravity the said unit in frictional driving contact with the traction wheels.

2. Apparatus for transmission of power from the traction wheels of motor vehicles, comprising a pair of lifting jacks, pivoted levers having unequal arms on the lifting jacks, means on the shorter arms of the levers to support an axle carrying traction wheels, a detachable shaft, bearings on the detachable shaft, friction wheels on the detachable shaft, one or more power transmitting elements on the said shaft, and yokes on the longer arms of the levers to detachably accommodate the bearings when the detachable shaft is positioned transversely to the said jacks.

3. In combination with the apparatus described in claim 2, releasable members adjustably engageable with the longer arms of the levers to support the axle and traction wheels in raised positions, and disengageable from the longer arms to permit the levers to turn under gravity and swing the friction wheels into contact with the traction wheels, and reengageable with the said longer arms to regulate the pressure between the friction wheels and the said traction wheels.

4. In apparatus for transmission of power from the traction wheels of motor vehicles, a lifting jack having a bed plate, a standard on the bed plate, a lever pivoted on the standard, releasable locking means mounted on the standard and adjustably engageable with the lever, a vertically disposed member carried on the lever and engageable with and adapted to support an axle carrying traction wheels, guides on the standard to maintain the vertically disposed member in upright position, and an adjustable mounting on the lever to support a power transmitting shaft.

5. In apparatus for transmission of power from the traction wheels of motor vehicles, a lifting jack having a bed plate, an upright standard on the bed plate, a pivot on the standard, a lever having unequal relatively inclined arms mounted on the said pivot, a transverse pin in the upper end of the standard, a strut carried by the shorter arm of the lever, guide links pivoted on the transverse pin and hinged to the strut, means adjustably mounted on the strut to engage and support an axle carrying traction wheels, a rack on the longer arm of the lever, a pawl pivoted on the transverse pin and engageable with the rack, a yoke on the longer arm of the lever to detachably accommodate a bearing of a power transmitting shaft, and an extension on the said longer arm for engagement with a detachable operating member.

6. A lifting jack as claimed in claim 5, having the upright standard integrally formed with the bed plate, ribs radiating from the standard and formed integrally therewith and with the bed plate, longitudinal ribs having bevelled ends on the underside of the bed plate, and chamfered ends on the said bed plate.

7. A lifting jack as claimed in claim 5, having the guide links equal in length to the shorter arm of the lever, and having the distance between the points of attachment of the strut to the lever and guide links the same as the interval on the said standard between the pivot and the transverse pin.

8. A lifting jack as set forth and claimed in claim 5, having a longitudinal recess in the longer arm of the lever, a slotted opening in the longitudinal recess, a boss on the yoke slidably fitting the longitudinal recess, and a bolt extending through the yoke and the slotted opening and adapted to secure the said yoke in adjusted positions on the longer arm of the lever.

9. In apparatus for transmission of power from the traction wheels of motor vehicles, having lifting means fitted with bearing supports and positioned at or near the opposite ends of the axle carrying traction wheels, a detachable power transmitting unit comprising, a shaft, friction wheels adjustably fixed to the shaft, one or more power transmitting elements on the shaft, a bearing mounted on the shaft in fixed position and adapted to rotatively support the same and to detachably and non-turnably fit the bearing supports, and a bearing slidable on the shaft and likewise adapted to rotatively support the same and to detachably and non-turnably fit the bearing supports.

10. In apparatus for transmission of power from the traction wheels of motor vehicles, having lifting jacks fitted with bearing yokes and positioned at or near the opposite ends of an axle carrying traction wheels, a detachable power transmitting unit comprising, a shaft, friction wheels adjustably fixed to the shaft, one or more pulleys on the shaft, a bearing mounted on the shaft and adapted to rotatively support the same and to detachably and non-turnably fit the bearing yokes, collars fixed to the shaft at opposite ends of the bearing, and a bearing slidable on the shaft and likewise adapted to rotatively support the same and to detachably and non-turnably fit the bearing yokes.

11. Apparatus for transmission of power from the traction wheels of motor vehicles, comprising separately transportable units to be manually associated when required for connection with and transmission of power from the traction wheels of a motor vehicle, said units comprising lifting means to be separately positioned near the opposite ends of an axle carrying the traction wheels, and detachable power transmitting means adapted to be adjusted to and engaged upon the lifting means after the same have been disposed in spaced position beneath the vehicle and to be set against the traction wheels by operation of the lifting means and maintained in frictional driving contact with said wheels by said lifting means.

12. Apparatus for transmission of power from the traction wheels of motor vehicles, comprising separately transportable units to be manually associated when required for connection with and transmission of power from the traction wheels of a motor vehicle, said units comprising similar lifting means to be separately positioned near the opposite ends of an axle carrying the traction wheels, releasable locking means mounted on and engageable with the lifting means to hold the same in adjusted positions, and detachable power transmitting means to be adjusted to and engaged upon the lifting means after the axle and traction wheels have been elevated by the same and secured in raised position by engagement of the releasable locking means with the lifting means, said lifting means on disengagement of the releasable locking means being adapted to position and maintain under gravity the detachable power transmitting means in frictional driving contact with the traction wheels.

13. Apparatus for transmission of power from the traction wheels of motor vehicles, comprising separately transportable units to be manually associated when required for connection with and transmission of power from the traction wheels of a motor vehicle, said units comprising similar lifting means to be separately positioned near the opposite ends of an axle carrying the traction wheels, releasable locking means mounted on and engageable with the lifting means to hold the same in adjusted positions, mountings on the lifting means, and detachable power transmitting means to be engaged within the mountings after the axle and traction wheels have been elevated by the lifting means and secured in raised position by engagement of the releasable locking means with the lifting means and adapted to be moved upon disengagement of the releasable locking means into frictional driving contact with the traction wheels by upward reaction set up in the lifting means by the weight of the axle and traction wheels and the portion of the vehicle carried thereby.

14. Apparatus for transmission of power from the traction wheels of motor vehicles, comprising separately transportable units to be manually associated when required for connection with and transmission of power from the traction wheels of a motor vehicle, said units comprising similar lifting means to be separately positioned near the opposite ends of an axle carrying the traction wheels, a detachable power transmitting unit including a rotatable shaft, friction wheels rotatable with said shaft, and power transmitting means on and rotatable with the shaft, and mountings arranged on the lifting means to receive the detachable power transmitting unit when the lifting means is releasably supporting the axle and traction wheels in raised position, said lifting means being adapted to lower the traction wheels from the raised position and simultaneously move the power transmitting unit toward the descending traction wheels and engage the friction wheels with and to bear upon and limit the descent of the said traction wheels and to be rotated thereby to actuate the power transmitting unit.

15. Apparatus for transmission of power from the traction wheels of motor vehicles, comprising three separately transportable units to be manually associated when required for connection with and transmission of power from the traction wheels of a motor vehicle, two of said units comprising jacks to be separately positioned near the opposite ends of an axle carrying the traction wheels and having bearing supports thereon, and the third of said units consisting of a detachable shaft to be engaged transversely upon the jacks after arrangement of the same in spaced position beneath the vehicle and having power transmitting means, bearings freely engaging the bearing supports, and friction wheels to be set in driving contact with the traction wheels by operation of said jacks.

16. Apparatus for transmission of power from the traction wheels of motor vehicles, comprising similar lifting means to be separately positioned near the opposite ends of an axle carrying the traction wheels of a motor vehicle, a bearing support on each of said lifting means, a power transmitting unit to be positioned transversely upon the lifting means and engaged thereby in frictional driving contact with the traction wheels, a bearing mounted in fixed position on the power transmitting unit, and a bearing slidable on said power transmitting unit, said bearing being adapted to freely engage the bearing supports and to be supported therein by placing the fixed bearing in one of said supports and adjusting the slidable bearing for engagement in the opposite support.

17. Apparatus for transmission of power from the traction wheels of motor vehicles, comprising elevating units to be positioned near the opposite ends of an axle carrying traction wheels, lifting members on the elevating units, adjustable axle supporting means on the lifting members to accommodate the elevating units to axles having different clearances, a detachable power transmitting shaft, friction wheels slidable on said shaft and adapted to be releasably secured thereon in position to correspond with various track widths, power transmitting means carried by the power transmitting shaft, bearings on the said shaft, and adjustable bearing supports engaged on the lifting members to freely hold the bearings when the detachable power transmitting shaft is positioned transversely to the lifting members and adapted to be fixed in adjusted positions on said members to accommodate the said shaft to traction wheels of various diameters.

18. Apparatus for transmission of power from the traction wheels of motor vehicles, comprising a pair of lifting jacks to be separately positioned near the opposite ends of an axle carrying traction wheels, a standard on each jack, a lever pivoted on the standard and each lever having a rack, a strut pivotally connected to one end of the lever, guide links connecting the standard and the strut and maintaining the latter in upright position, axle supporting means adjustably mounted on the struts, a pawl pivoted on each standard and engageable with the corresponding lever rack, an adjustable yoke on each lever, means for fixing the yokes in adjusted positions on the levers, a detachable power transmitting shaft, a pulley on said shaft, bearings on the shaft freely engaging the adjustable yokes, and friction wheels on said shaft to be set in frictional engagement with the traction wheels by operation of said levers.

19. Apparatus for transmission of power from the traction wheels of motor vehicles, comprising a lifting jack having a pivoted lever to raise, support, and lower an axle and traction wheel, a rack on the lever, a pawl engageable with the rack to maintain the lever in adjusted positions, a bearing adjustably fixed to the lever, a shaft rotatably supported in the bearing, a friction wheel on the shaft adapted to engage with and be driven by the traction wheel, and power transmitting means on the said shaft.

In witness whereof I have hereunto affixed my signature.

EDWIN THOMAS JAMES.